Nov. 25, 1958 W. H. SMITH 2,861,627
RETRACTABLE SAFETY BELT
Filed Oct. 31, 1955 2 Sheets-Sheet 2
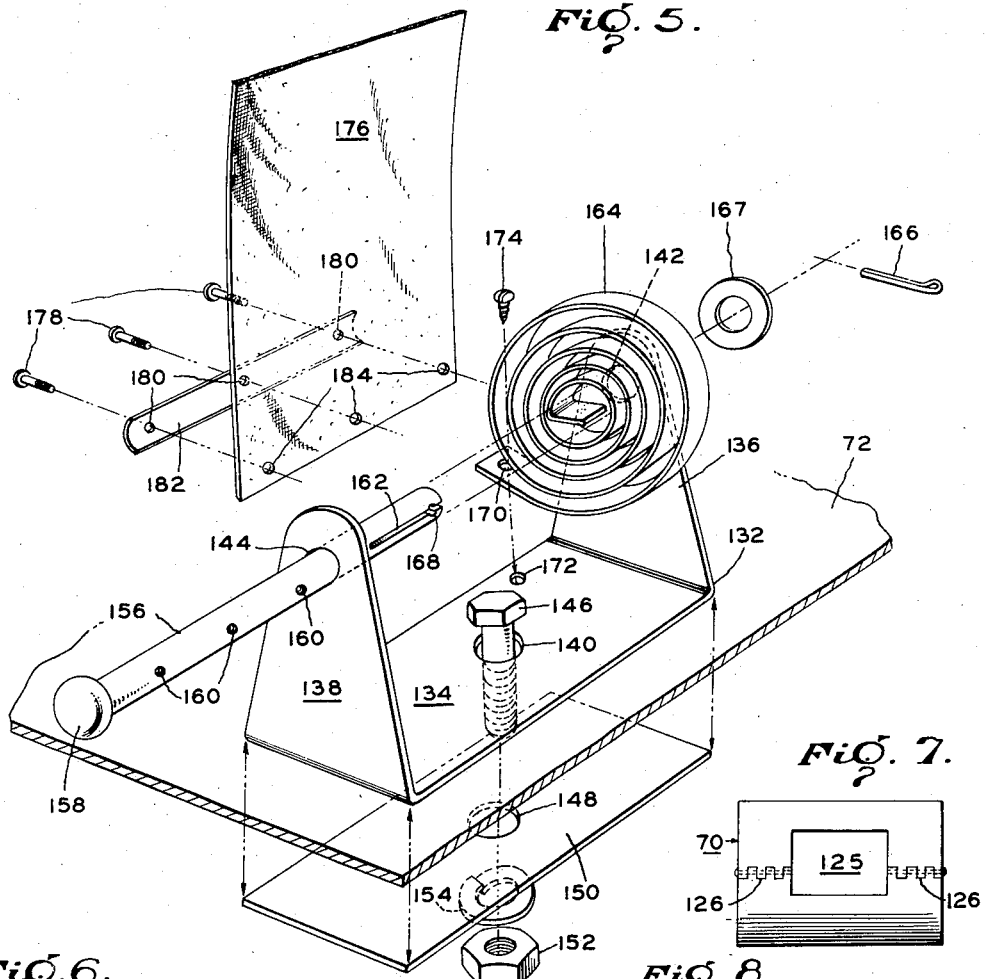
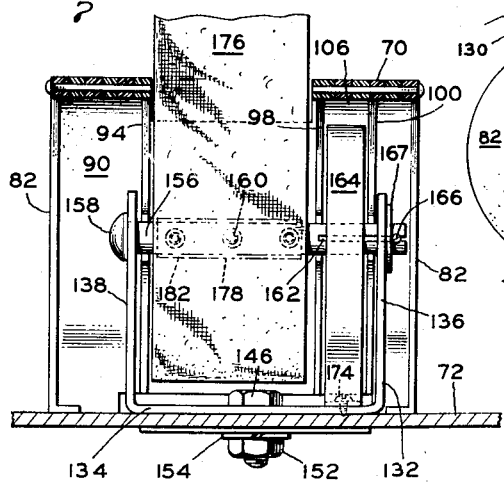
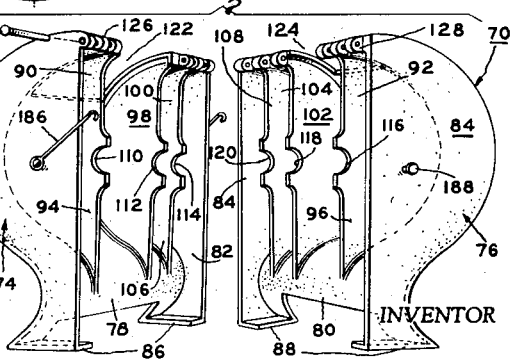
INVENTOR
William H. Smith.
BY Gustave Miller
ATTORNEY though only one is shown in the figures, can be used.

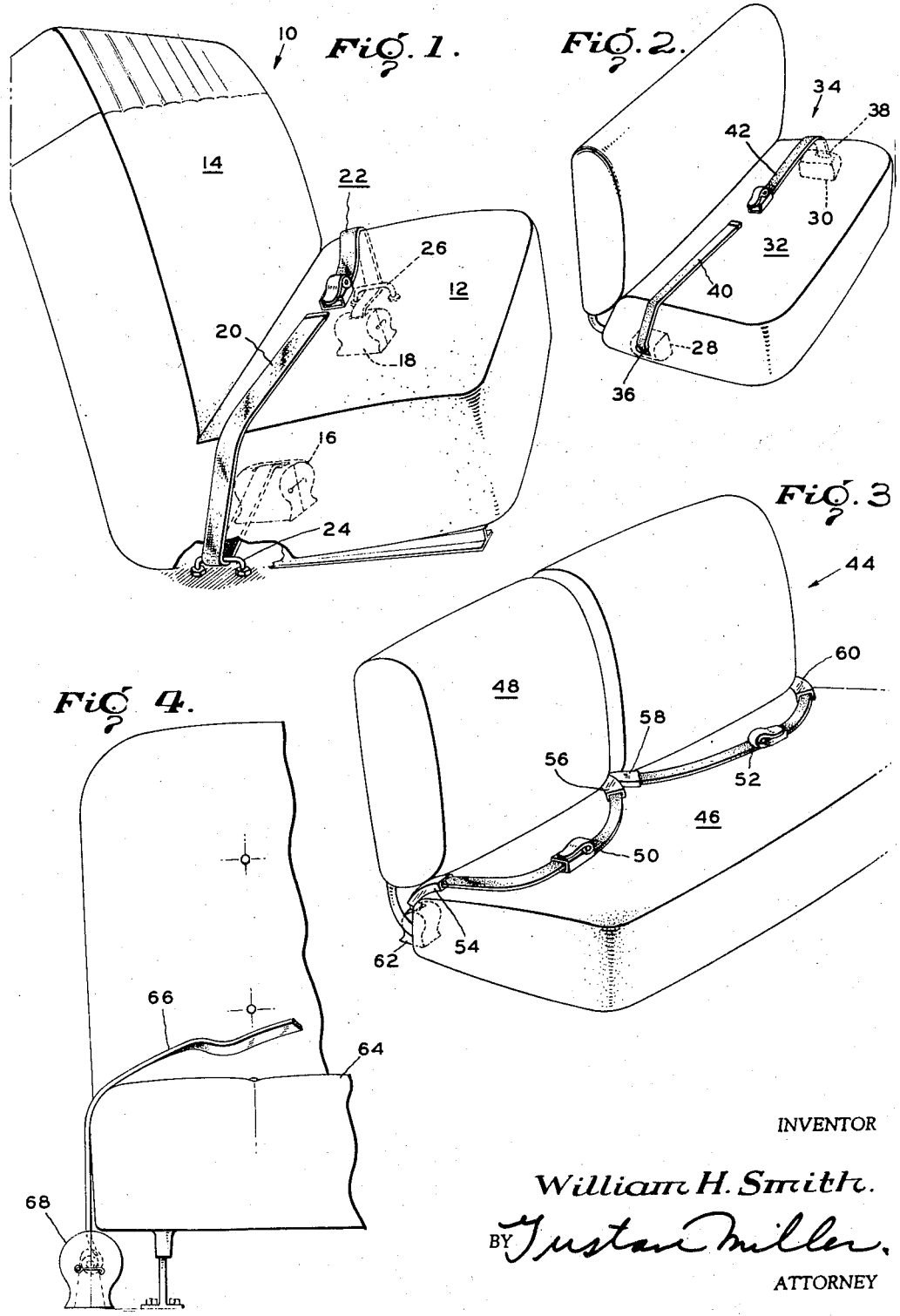

United States Patent Office
2,861,627
Patented Nov. 25, 1958

2,861,627

RETRACTABLE SAFETY BELT

William H. Smith, North Chicago, Ill.

Application October 31, 1955, Serial No. 543,840

1 Claim. (Cl. 155—189)

This invention relates to a safety belt of the type used in airplanes and automobiles, and it particularly relates to safety belts which are automatically retracted when not in use.

The type of safety belts used heretofore generally consisted of a pair of straps, each connected at one end to the seat and having a fastening means such as a buckle mechanism for releasably connecting the straps around a seated person. When these straps were disconnected they merely hung loosely on the seat or flapped down to the floor. As a result, the upholstery is marred and torn; it also makes entrance and exit past the seat difficult and cumbersome, when used in an automobile. Furthermore, when used in an automobile, the straps tend to join between the door frame and the door if they hang loosely.

It is therefore, one object of the present invention to provide a safety belt which is easily accessible to the user, yet instantly and automatically retracts into a storage area out of the way.

Another object of the present invention is to provide a safety belt which can be incorporated directly into the interior design of the vehicle.

Other objects of the present invention are to provide an improved safety belt, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a perspective view of one form of seat equipped with a belt embodying the present invention.

Fig. 2 is a perspective view of a second form of seat embodying the invention.

Fig. 3 is a perspective view of a third form of seat embodying the invention.

Fig. 4 is a fragmentary, front elevational view of a fourth form of seat embodying the invention.

Fig. 5 is a fragmentary, exploded view of the retraction mechanism, with the housing removed.

Fig. 6 is a side elevational view of the retraction mechanism, with the housing shown in section.

Fig. 7 is a top plan view of the retraction mechanism, with the housing in place.

Fig. 8 is a perspective view of the housing in open position.

Referring now in greater detail to the drawings wherein similar reference characters refer to similar parts, there is shown, in Fig. 1, a seat, generally indicated at 10, comprising a cushion portion 12 and a back-rest 14. On the floor, under the seat, is provided a retraction housing 16 adjacent one side, and a second retraction housing 18 adjacent the opposite side. From each of the housings extends a strap, as at 20 and 22. These straps, furthermore, each extend through a U-bolt on the floor, as at 24 and 26. In this manner, the stress of the belt straps is placed on the U-bolt rather than on the edge of the seat, when the belt is in use.

In Fig. 2, the retraction housings 28 and 30 are provided on the internal surfaces of the sides of the hollow seat cushion 32 of the seat 34. The housings are positioned on the internal surfaces of the cushion sides so that the housings will not be in view of the general observer. Slits 36 and 38 are formed in the sides of the cushion, the straps 40 and 42 extending therethrough. Although not shown, the housings 28 and 30 can be placed on the outer surfaces of the cushion and this is, of course, necessary where the cushion is not hollow. When used externally, the housings can be made to correspond to the decorative scheme of the seat. This external assembly has various disadvantages, among the more important of which is the fact that they form obstructions in the aisle and require additional space.

In Fig. 3, the double seat 44, having cushion 46 and a divided back-rest 48, is provided with a pair of belts 50 and 52. A sleeve is provided at each end of the belt straps, as at 54, 56, 58 and 60, adjacent the back edge of the cushion. The straps extend through the sleeves and into housings 62 on the floor at the rear of the seat. When the straps are unfastened from each other, they retract into the housings with their free ends being accessible within their respective sleeves. The sleeves are preferably constructed of a synthetic resin such as vinyl or polyethylene, although any desirable type of material can be used.

In Fig. 4, the seat 64 is provided with a belt 66, the strap ends of which extend into housings 68 on the floor adjacent each side of the seat. This type of arrangement permits the installation of the device without making any changes in the seat.

The retracting mechanism, itself, is illustrated in Figs. 5 to 8, and comprises a housing 70 mounted, as illustrated, on a floor board 72. This housing consists of two duplicate, complementary sections 74 and 76, best shown in Fig. 8. Each housing section is provided with a curved back wall, as at 78 and 80, and with opposite side walls, as at 82 and 84. The back walls and side walls of each section combine to form channel-like, half-feet, as at 86 and 88. Complementary channels 90 and 92 are provided in each housing section, at one side thereof, these channels being formed between the side walls and the respective inner walls 94 and 96 in the sections 74 and 76.

A second pair of internal walls in each section, as at 98, 100 and 102, 104, form a second channel 106 in section 74 and 108 in section 76. The walls 82, 94, 98 and 100 in section 74 and 84, 96, 102 and 108 in section 76 are each provided with a substantially straight edge. At the center of each of these straight edges is provided a semi-circular recess, as at 110, 112, 114, 116, 118 and 120; each of these recesses being defined by outwardly extending fingers having mating straight edges adapted to form a shaft opening extending laterally through the housing when the two sections are closed against each other.

The two housing sections are each provided, at their tops, with an opening between the two internal channels, as at 122 and 124. These openings form a center opening 125 in the top of the housing when it is closed. They are also provided with a series of eyelets 126 and 128 which mate laterally to form hinges at each side of the top openings 122 and 124. Hinge pins 130 are adapted to extend through the laterally mating eyelets to hingedly hold them together.

Within the housing is provided a bracket 132 having a horizontal portion 134 from which extend two vertical arms 136 and 138. A hole 140 is provided, centrally of the portion 134, and holes 142 and 144 are provided in the arms 136 and 138.

The bracket 132 is attached to the floor-board by a bolt 146 extending through hole 140 in the bracket and through a corresponding hole in the floor-board. It also extends through a hole 148 in a base plate 150 under the floor-board. A nut 152 and washer 154 are used to clamp the bolt in place.

A shaft 156 having a head 158, a series of holes 160, and a slot 162, is adapted to be inserted through the holes 142 and 144 in the bracket and through the shaft opening formed by the series of semi-circular recesses in the internal walls. This shaft is adapted to hold the corresponding belt straps wound thereon in retracted position within the housing. This is accomplished by attaching one end of a torsion spring 164 to the shaft 156 by inserting the end of the spring within into the slot 162 in the shaft and then locking it in place by means of a cotter pin 166 inserted through hole 168 intersecting the slot 162, and which coacts with washer 167. The opposite end of the spring is provided with a hole 170 which mates with hole 172 in the bracket portion 134 when the spring end is pulled down. A screw 174, extending through mating holes 170 and 172, holds the spring end in extending position.

A belt strap, illustrated at 176, has one of its ends connected to the shaft by means of screws 178 inserted through holes 180 in a curved back-plate 182, through mating holes 184 in the belt, and through holes 160 in the shaft 156.

The strap 176 is positioned within the compartment formed by channels 90 and 92 when the housing is closed, and the spring 164 is positioned in the compartment formed by channels 106 and 108. The spring acts to resiliently bias the shaft into a rotatable position wherein the strap is almost completely rolled up thereupon within the housing. Only the free end of the strap extends out from the housing at this time so that it may be grasped.

A hook 186 is provided at each side of housing section 82 and are adapted to hook onto pins 188 on the sides of section 84 to lock the housing sections together.

Although this invention has been described in considerable detail, such description is intended as being illustrative rather than limiting, since the invention may be variously embodied, and the scope of the invention is to be determined as claimed.

Having thus set forth and disclosed the nature of this inveniton, what is claimed is:

An automatically retractable safety belt assembly for a seat comprising a pair of separable straps, means to couple the straps together, a separate receptacle positioned on supporting means adjacent opposite ends of said seat at opposite ends of said straps, said opposite ends each being connected to a rotatable shaft within its corresponding receptacle, and biasing means resiliently urging each of said shafts to a rotatable position in which the strap, connected thereto, is wound up thereon, each of said receptacles comprising a pair of hinged sections each divided into separate but cooperating compartments, and wherein the shaft extends through said compartments, said strap being positioned in one pair of said compartments, and the biasing means being positioned in another pair of said cooperaitng compartments.

References Cited in the file of this patent
UNITED STATES PATENTS

| | | |
|---|---|---|
| 2,365,625 | Carlisle | Dec. 19, 1944 |
| 2,403,653 | Geohegan et al. | July 9, 1946 |
| 2,480,915 | George | Sept. 6, 1949 |
| 2,488,858 | Franz | Nov. 22, 1949 |
| 2,725,097 | Thoreson | Nov. 29, 1955 |
| 2,798,539 | Johnson | July 9, 1957 |